(12) United States Patent
Chiang et al.

(10) Patent No.: US 7,667,688 B2
(45) Date of Patent: Feb. 23, 2010

(54) CURSOR CONTROL DEVICE

(75) Inventors: Hsiao-Lung Chiang, Taipei (TW); Chun-Nan Su, Taipei (TW); Hong-Che Yen, Taipei (TW); Chih-Hung Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 651 days.

(21) Appl. No.: 11/456,041

(22) Filed: Jul. 6, 2006

(65) Prior Publication Data
US 2007/0273651 A1    Nov. 29, 2007

(30) Foreign Application Priority Data
May 24, 2006  (TW) ............................... 95118400 A

(51) Int. Cl.
*G09G 5/08* (2006.01)
*G09G 5/00* (2006.01)
*G06F 3/041* (2006.01)

(52) U.S. Cl. ..................... 345/163; 345/156; 345/173

(58) Field of Classification Search .......... 345/156–178
See application file for complete search history.

(56) References Cited

U.S. PATENT DOCUMENTS

| | | | |
|---|---|---|---|
| 2003/0117377 A1* | 6/2003 | Horie et al. | 345/173 |
| 2004/0001042 A1* | 1/2004 | Lindhout et al. | 345/156 |
| 2006/0176277 A1* | 8/2006 | Daniel et al. | 345/163 |

* cited by examiner

*Primary Examiner*—Sumati Lefkowitz
*Assistant Examiner*—Charles Hicks
(74) *Attorney, Agent, or Firm*—Apex Juris, PLLC; Tracy M Heims

(57) ABSTRACT

A cursor control device includes a main body, a circuit board, a base, a touch support stand, a touch sensor and a knock sensor. The circuit board is disposed within the main body. The base is disposed within the main body and above the circuit board, and includes an elongated slot. The touch support stand is mounted on the base and aligned with the elongated slot. The touch sensor is supported on the touch support stand and electrically connected to the circuit board. In response to a touching action on the touch sensor, a screen scrolling signal is generated. The knock sensor is mounted on the circuit board and under the touch support stand. The knock sensor is triggered when the touch support stand is moved to touch the knock sensor.

5 Claims, 5 Drawing Sheets

CURSOR CONTROL DEVICE

FIELD OF THE INVENTION

The present invention relates to a cursor control device, and more particularly to a cursor control device having a slim-type touch sensor for activating a third-button signal.

BACKGROUND OF THE INVENTION

Nowadays, computers become essential data processing apparatuses in the digitalized and electronic societies. For helping the user well operate the computer system, the hardware and the software associated with the computer system are developed in views of humanization and user-friendliness. For example, in addition to the basic functions of controlling cursor movement and selecting an item on the option menu, the mouse device (which is also referred as pointing device or cursor control device) has extended functions. For example, the mouse device may have a scroll wheel assembly or a tilt wheel assembly for controlling vertical and horizontal movement of the cursor.

Referring to FIG. 1, a schematic perspective view of a tilt wheel type mouse 10 is illustrated. The tilt wheel type mouse 10 is developed in combination of the wheel button technology and the tilt wheel technology. The tilt wheel assembly 11 of the mouse 10 can be rotated forwardly or backwardly, or tilted toward the left or right side, thereby scrolling the image shown on graphic user interface or the window interface upwardly, downwardly, leftward or rightwards. When the tilt wheel assembly 11 is pressed down, a knock sensor is triggered, so that the functions of a wheel button are enabled. Since the tilt wheel assembly 11 is arranged between a left click button 12 and a right click button 13, the wheel button is also referred as a third click button. Depending on the manufacturer's or the user's design, the functions of the third click button are varied.

For minimization, as shown in FIG. 2, a slim mouse 20 having a touch thin film switch 21 is developed. Since the level of the mouse 21 relative to the desk plane is lower than that of the mouse 10 having the scroll wheel assembly 11, the mouse 20 of FIG. 2 is slimmer and has reduced overall volume.

As known, the touch thin film switch 21 is a thin film array switch implemented by plural electronic components (not shown), which are discretely arranged at regular intervals. By using the user's finger to touch a surface of the touch thin film switch 21, the scrolling direction is determined according to the initial and final touching locations. As a result, the slim mouse 20 has the functions identical to those activated by rotating the scroll wheel assembly.

Unfortunately, although the slim mouse 20 has the touch thin film switch 21 to execute the functions as the conventional scroll wheel assembly, the third click button lacks the mechanism as the knock sensor of the third click button. Therefore, the slim mouse 20 has only a left click button 22 and a right click button 23 but fails to execute the extended functions as the third click button.

In views of the above-described disadvantages resulted from the prior art, the applicant keeps on carving unflaggingly to develop a cursor control device according to the present invention through wholehearted experience and research.

SUMMARY OF THE INVENTION

It is an object of the present invention to provide a cursor control device having a slim-type touch sensor for activating a third-button signal In accordance to an aspect of the present invention, there is provided a cursor control device. The cursor control device comprises a main body, a circuit board, a base, a touch support stand, a touch sensor and a knock sensor. The circuit board is disposed within the main body. The base is disposed within the main body and above the circuit board, and includes an elongated slot. The touch support stand is mounted on the base and aligned with the elongated slot. The touch sensor is supported on the touch support stand and electrically connected to the circuit board. In response to a touching action on the touch sensor, a screen scrolling signal is generated. The knock sensor is mounted on the circuit board and under the touch support stand. The knock sensor is triggered when the touch support stand is moved to touch the knock sensor.

In an embodiment, the touch sensor is a touch thin film switch.

In an embodiment, the touch support stand has a protrusion edge and a hooking part.

In an embodiment, the touch support stand is coupled with the base via an elastic connecting part, wherein the base, the touch support stand and the elastic connecting part are integrally formed.

In an embodiment, the cursor control device further comprises two tilt operation keys and two tilt sensing switch. These two tilt operation keys arranged at bilateral sides of the touch sensor and mounted on the base. These two tilt sensing switch are protruded from bilateral sides of the touch sensor and under the two tilt operation keys, respectively.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 3:
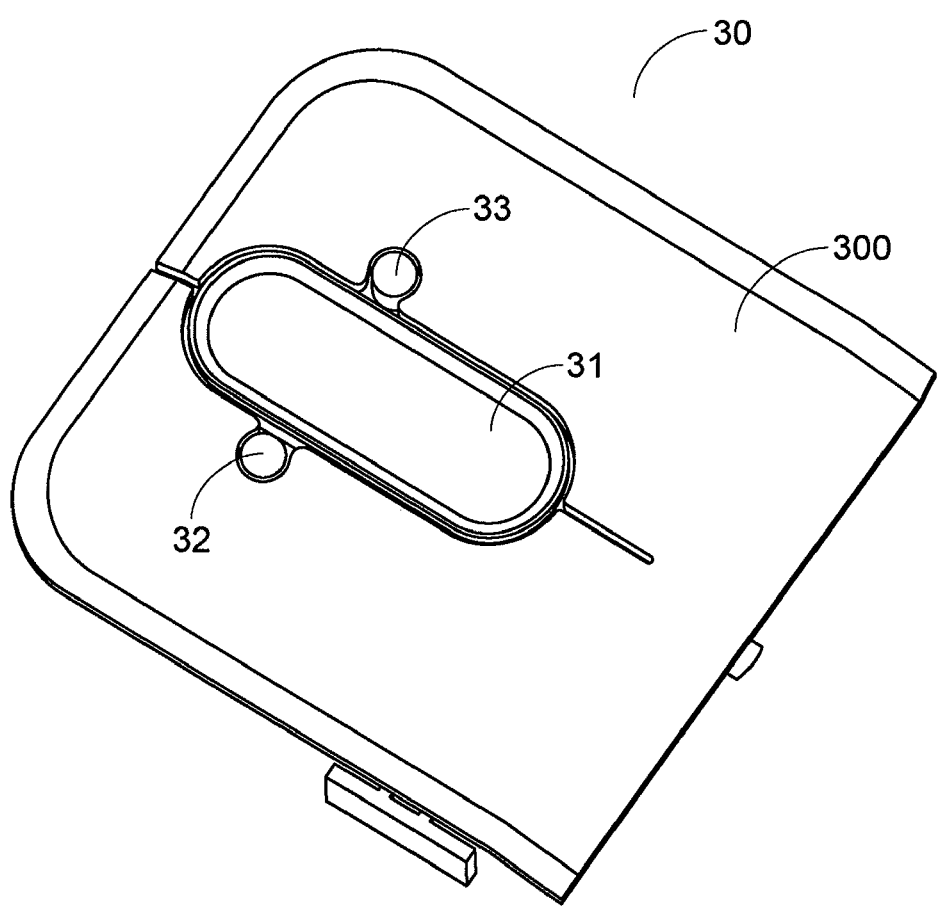
FIG. 3 is a schematic outward view of a cursor control device according to a first preferred embodiment of the present invention.

Referring to FIG. 3, a schematic outward view of a cursor control device according to a first preferred embodiment of the present invention is illustrated. In this embodiment, the exemplary cursor control device 30 is a slim mouse. For clarification, only partial components are shown in FIG. 3.

Figure 1:
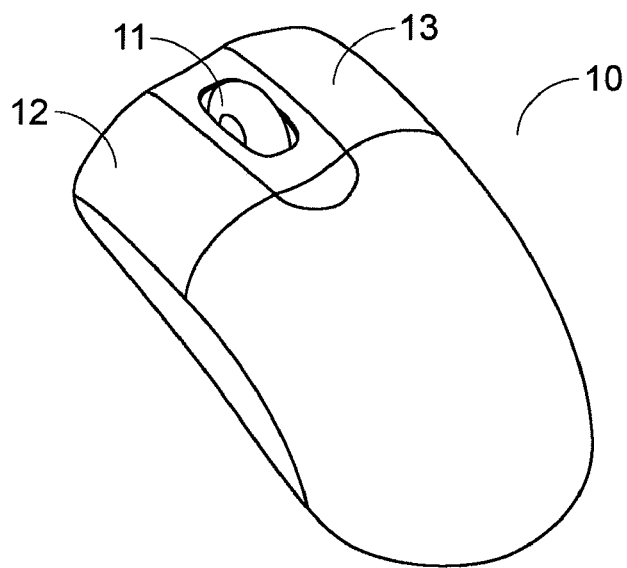
FIG. 1 is a schematic perspective view of a conventional tilt wheel type mouse.
Figure 2:
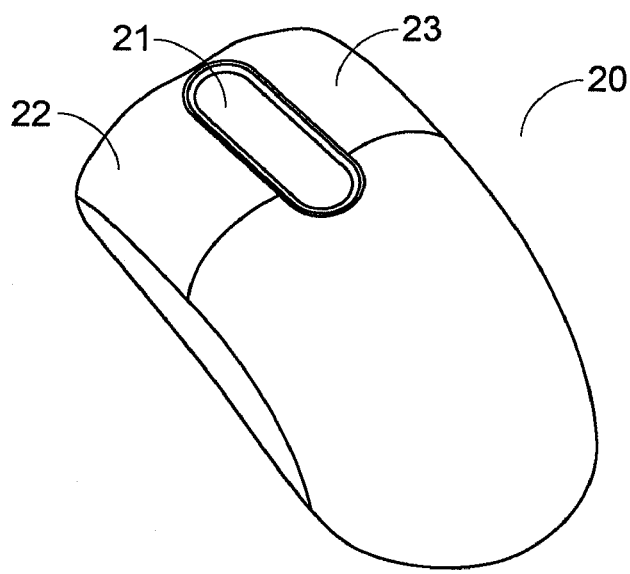
FIG. 2 is a schematic perspective view of a conventional slim mouse having a touch thin film switch.

The slim mouse 30 of FIG. 3 comprises a main body 300, a touch sensor 31 and two tilt operation keys 32 and 33. By moving the user's finger on the touch sensor 31, a screen scrolling signal is generated to control vertical scrolling movement of the image shown on the display screen of the computer system. An example of the touch sensor 31 includes a thin film array switch, as is described in FIG. 2. The tilt operation keys 32 and 33 are arranged on bilateral sides of the touch sensor 31. By pressing down the click buttons 32 and 33, the functions of the tilt wheel assembly are enabled, and thus the image shown on the display screen is continuously scrolled leftwards or rightwards. Hereinafter, the detailed structure and the operation principles of the slim mouse 30 will be illustrated as follows in more details.

Figure 4:
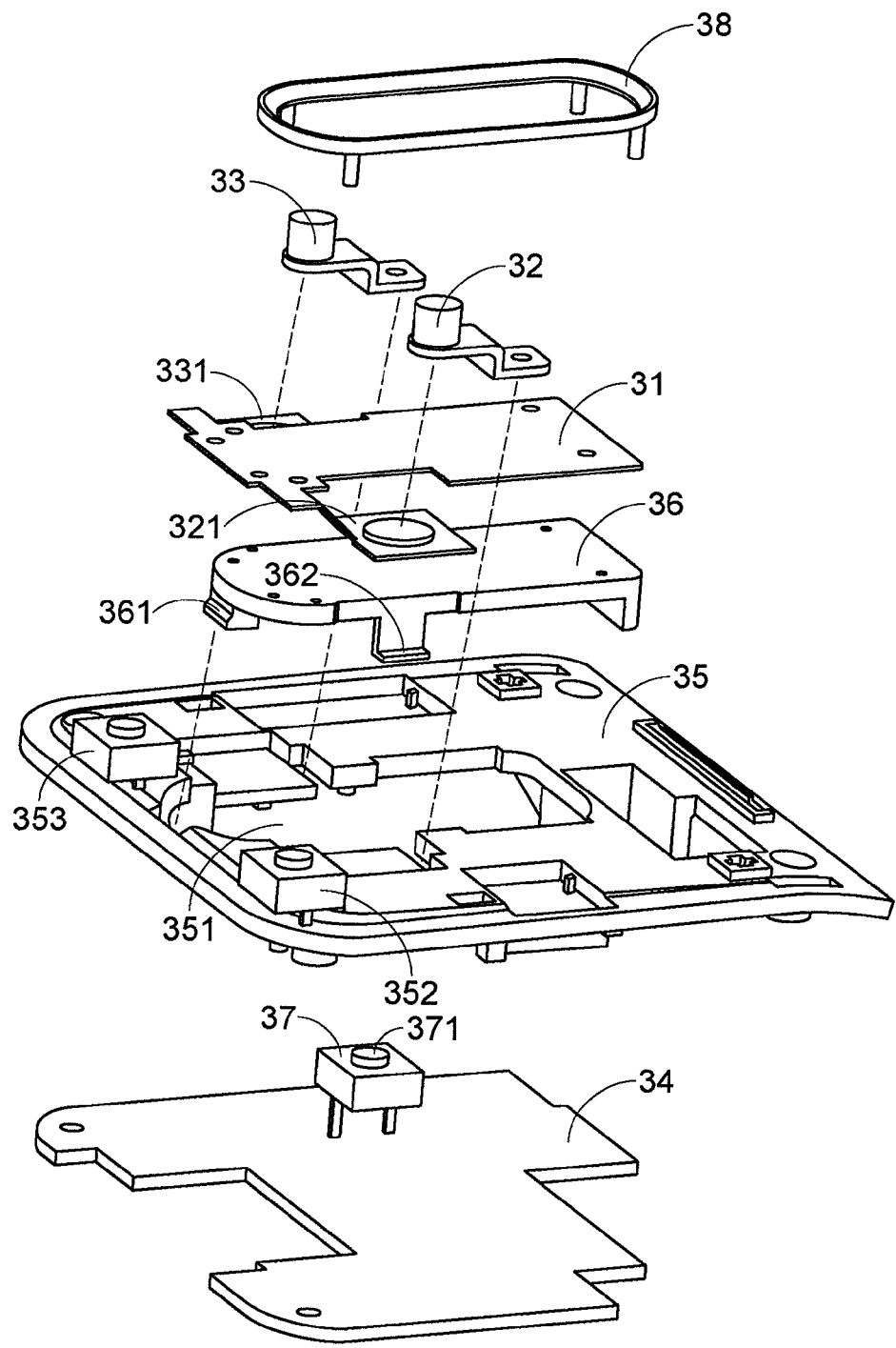
FIG. 4 is a schematic exploded view illustrating the inner structure of the slim mouse shown in FIG. 3.

Please refer to FIG. 4, which is a schematic exploded view illustrating the inner structure of the slim mouse 30. In the main body 300 of the slim mouse 30, a circuit board 34, a base 35 and touch support stand 36 are included. The circuit board 34 has several electronic components mounted thereon for controlling operation of the slim mouse 30. The base 35 is disposed above the circuit board 34. The touch support stand 36 is used for supporting the touch sensor 31 thereon. After the touch sensor 31 lies flat on the touch support stand 36, the combination of the touch sensor 31 and the touch support stand 36 is mounted on the base 35.

Please refer to FIG. 4 again. The base 35 includes an elongated slot 351 aligned with the touch support stand 36. In addition, the touch support stand 36 has a protrusion edge 361 and a hooking part 362 protruded from the periphery thereof. Via the protrusion edge 361 and the hooking part 362, the touch support stand 36 is engaged with the sidewalls of the elongated slot 351. As a consequence, the touch support stand 36 will not be detached from the base 35 during operation of the slim mouse 30.

As shown in FIG. 4, a knock sensor 37 such as a microswitch element is mounted on the circuit board 34 and disposed under the touch support stand 36. The knock sensor 37 is penetrated through the elongated slot 351 of the base 35 such that a triggering end 371 of the knock sensor 37 is in contact with the touch support stand 36. Especially, the triggering end 371 of the knock sensor 37 is made elastic. In accordance with a major feature of the present invention, the functions of the third click button is enabled when the knock sensor 37 is triggered. That is, once a depressing force is exerted on the touch support stand 36, the touch support stand 36 is shifted vertically toward the circuit board 34 to trigger the knock sensor 37. In response to the depressing force, a knock sensing signal is generated. Due to the elastic property of the triggering end 371, the touch support stand 36 can be moved upwardly to its original shape after the depressing force is relieved.

Please refer to FIG. 4 again. The tilt operation keys 32 and 33 are mounted on the base 35 at the locations as shown in the dotted lines. Two tilt sensing switch 321 and 322 are protruded from bilateral sides of the touch sensor 31 and under the tilt operation keys 32 and 33, respectively. When a pushing force is exerted on the tilt operation keys 32 and 33, the tilt sensing switch 321 and 322 are respectively triggered to control horizontal scroll movement of the image. Moreover, a left click button sensor 352 and a right click button sensor 353 are disposed on the base 35 at the locations corresponding to the left click button and the right click button of the slim mouse 30, respectively. By the way, the tilt sensing switch 321 and 322 are optionally equipped according to the manufacturer's design.

As shown in FIG. 4, the slim mouse 30 further comprises an indication ring 38 for coupling the touch sensor 31 with the touch support stand 36. The field defined by the indication ring 38 means the allowable range of moving the user's finger on the touch sensor 31.

Figure 5:
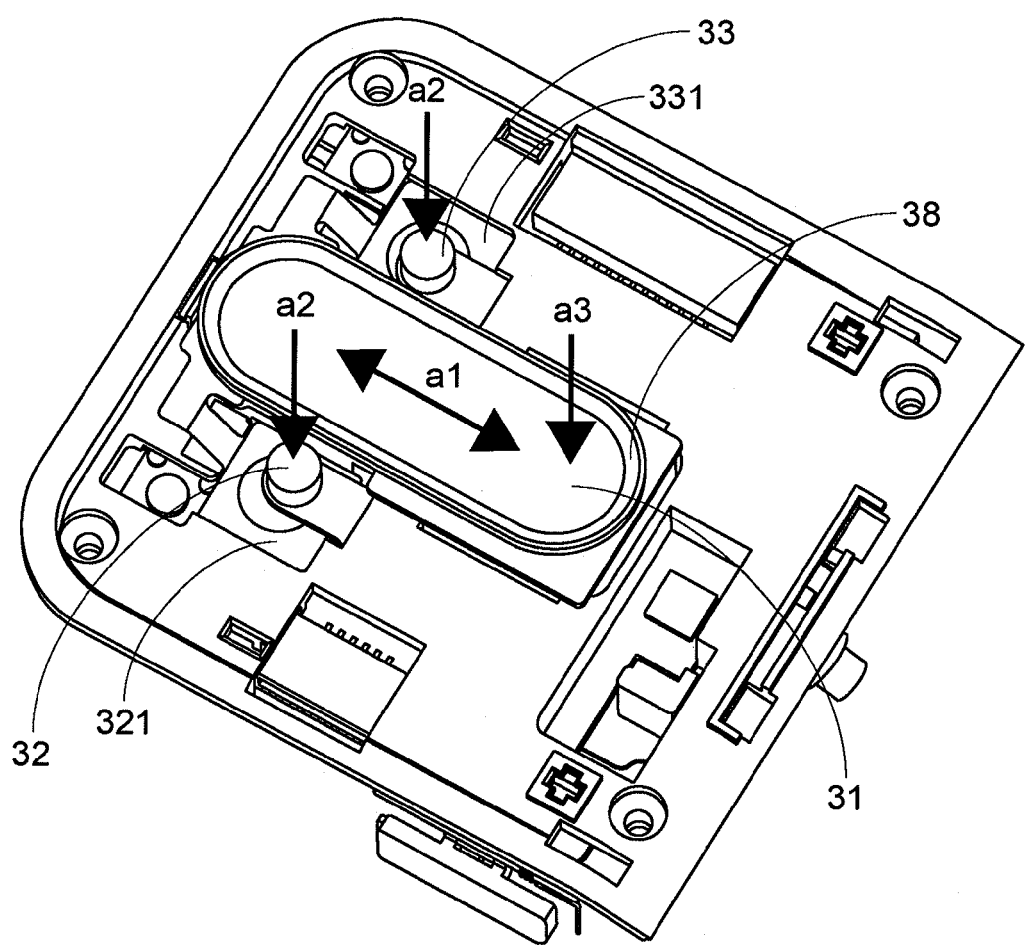
FIG. 5 is an assembled view of the slim mouse of FIG. 4.

Referring to FIG. 5, a schematic assembled view of the slim mouse of FIG. 4 is illustrated. By moving the user's finger on the touch sensor 31 along the direction a1, the touch sensor 31 is triggered to scroll the image shown on graphic user interface upwardly or downwardly. When the tilt operation keys 32 and 33 are pressed down along the direction a2, the tilt sensing switch 321 and 322 are triggered to control horizontal scroll movement of the image. In a case that a pushing force is exerted on the touch sensor 31 along the direction a3, the knock sensor 37 under the touch support stand 36 is triggered to enable the functions of the third click button.

Figure 6:
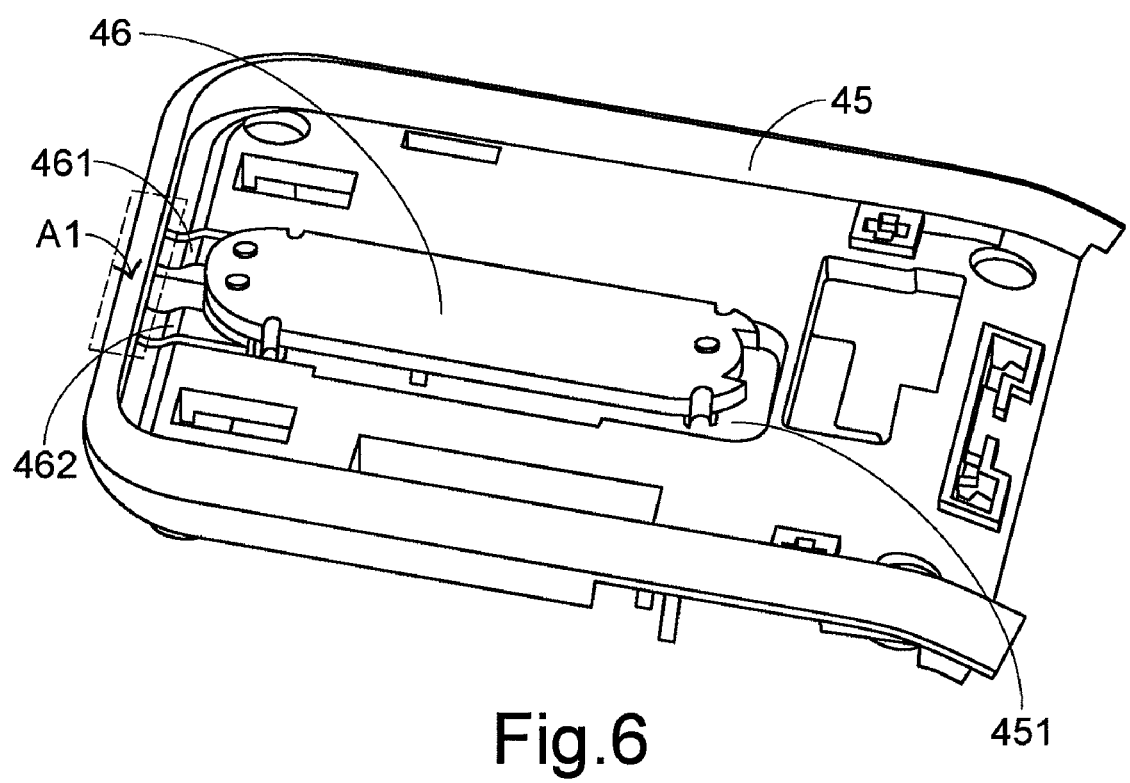
FIG. 6 is a schematic view of a cursor control device according to a second preferred embodiment of the present invention, wherein only the touch support stand and the base are shown in the drawing.

A further embodiment of a cursor control device is illustrated in FIG. 6. In this embodiment, the touch sensor, the indication ring and the circuit board included therein are similar to those shown in FIG. 4, and are not redundantly described herein. For clarification, only the touch support stand and the base are shown in the drawing. The base 45 includes an elongated slot 451 aligned with the touch support stand 46. The touch support stand 46 is coupled with the base 45 via elastic connecting parts 461 and 462. It is preferred that the base 45, the touch support stand 46 and the elastic connecting parts 461 and 462 are integrally formed. Since the touch support stand 46 is coupled with the base 45 via elastic connecting parts 461 and 462, once a depressing force is exerted on the touch support stand 46, the touch support stand 46 is shifted vertically toward the circuit board to trigger the knock sensor with the connecting portion A1 serving as the fulcrum.

From the above embodiment, the cursor control device of the present invention is capable of scrolling the image shown on the display screen by using a thin film array switch. In addition, due the special mechanism including the touch support stand and the base, the cursor control device of the present invention can activate the third axle functions, i.e. the functions of the third click button.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cursor control device comprising:
   a main body;
   a circuit board disposed within said main body;
   a base disposed within said main body and above said circuit board, and including an elongated slot;
   a touch support stand mounted on said base and aligned with said elongated slot;
   a touch sensor supported by said touch support stand and electrically connected to said circuit board, wherein a screen scrolling signal is generated in response to a touching action on said touch sensor; and
   a knock sensor mounted on said circuit board and under said touch support stand, wherein said knock sensor is triggered when said touch support stand is moved to touch said knock sensor.

2. The cursor control device according to claim 1 wherein said touch sensor is a touch thin film switch.

3. The cursor control device according to claim 1 wherein said touch support stand has a protrusion edge and a hooking part.

4. The cursor control device according to claim 1 wherein said touch support stand is coupled with said base via an elastic connecting part, wherein said base, said touch support stand and said elastic connecting part are integrally formed.

5. The cursor control device according to claim 1 further comprising:
   two tilt operation keys arranged at bilateral sides of said touch sensor and mounted on said base; and
   two tilt sensing switch protruded from bilateral sides of said touch sensor and under said two tilt operation keys, respectively.

* * * * *